United States Patent [19]

Schweckendiek et al.

[11] 4,139,543

[45] Feb. 13, 1979

[54] MANUFACTURE OF 2-AMINO-3-BROMOANTHRAQUINONE

[75] Inventors: Walter Schweckendiek, Ludwigshafen; Heinrich Hiller, Wachenheim; Reinhold Kohlhaupt, Ludwigshafen, all of Fed. Rep. of Germany

[73] Assignee: BASF Aktiengesellschaft, Ludwigshafen, Fed. Rep. of Germany

[21] Appl. No.: 874,249

[22] Filed: Feb. 1, 1978

[30] Foreign Application Priority Data

Feb. 8, 1977 [DE] Fed. Rep. of Germany ....... 2705106

[51] Int. Cl.$^2$ .......................... C07C 97/24; C09B 1/20
[52] U.S. Cl. ................................... 260/381
[58] Field of Search .................. 260/381, 694

[56] References Cited

U.S. PATENT DOCUMENTS

| 2,236,672 | 4/1941 | Coffey et al. | 260/381 |
| 2,835,700 | 5/1958 | Boyle et al. | 260/694 |

FOREIGN PATENT DOCUMENTS

| 261270 | 8/1911 | Fed. Rep. of Germany | 12/37 |
| 273809 | 11/1911 | Fed. Rep. of Germany | 12/37 |

*Primary Examiner*—Winston A. Douglas
*Assistant Examiner*—Raymond Covington
*Attorney, Agent, or Firm*—Oblon, Fisher, Spivak, McClelland & Maier

[57] ABSTRACT

In a process for the manufacture of 2-amino-3-bromoanthraquinone by heating 2-aminoanthraquinone with bromine (in the molar ratio of 1:1) in sulfuric acid, while mixing, the improvement wherein crude 2-aminoanthraquinone, in sulfuric acid of from 60 to 90 per cent strength by weight, which contains from 10 to 15% by weight of an alkanecarboxylic acid of 3 or 4 carbon atoms or a mixture of such acids, is heated with from 1 to 1.05 moles of bromine per mole of 2-aminoanthraquinone at from 130 to 150° C. The 2-amino-3-bromoanthraquinone which is isolated may be used for the manufacture of dyes. It is at least as pure as that obtained from purified 2-aminoanthraquinone by the process of the prior art.

10 Claims, No Drawings

MANUFACTURE OF 2-AMINO-3-BROMOANTHRAQUINONE

The present invention relates to a process for the manufacture of 2-amino-3-bromoanthraquinone from crude 2-aminoanthraquinone.

2-Amino-3-bromoanthraquinone is an intermediate for the preparation of valuable vat dyes. It is obtained by brominating 2-aminoanthraquinone in organic solvents, eg. glacial acetic acid or nitrobenzene (German Patent No. 273,809). According to German Patent No. 261,270, heating 1,3-dibromo-2-aminoanthraquinone with 2-aminoanthraquinone in sulfuric acid at from 150 to 180° C. gives 2-amino-3-bromoanthraquinone. In a variant of this process, 2-aminoanthraquinone is dissolved in hot sulfuric acid of from 78 to 80 per cent strength by weight, after cooling 1 mole of bromine is added to the mixture per mole of aminoanthraquinone, and the mixture is then heated to 180–190° C. in the course of from 1 to 2 hours, whilst stirring. Hereupon, the mixture of the sulfates of 2-aminoanthraquinone, 2-amino-3-bromoanthraquinone and 2-amino-1,3-dibromoanthraquinone is converted to the sulfate of 2-amino-3-bromoanthraquinone (German Patent 261,271).

If purified 2-aminoanthraquinone (>95 per cent by weight pure) is used, each of the processes gives a product which may be used to synthesize dyes. If crude 2-aminoanthraquinone (from 85 to 87 per cent by weight pure) is used, bromination in solvents gives an impure product. The sulfuric acid process of German Patent Nos. 261,270 and 261,271 cannot be carried out with crude 2-aminoanthraquinone, since the mixture froths so heavily, even on very slow heating-up (for example over a period of more than 20 hours) that the reaction mixture overflows from the kettle. The process is not therefore industrially feasible, and is uncontrollable.

It is an object of the present invention to provide a process by means of which a 2-amino-3-bromoanthraquinone which can be used as an intermediate for the manufacture of dyes may be obtained by brominating crude 2-aminoanthraquinone.

We have found that this object is achieved and that a 2-amino-3-bromoanthraquinone which is sufficiently pure for the manufacture of dyes may be obtained by heating 2-aminoanthraquinone with bromine, in the molar ratio of 1:1, in sulfuric acid, whilst mixing, if crude 2-aminoanthraquinone, in sulfuric acid of from 60 to 90 per cent strength by weight, which contains from 10 to 15 per cent by weight, based on the sulfuric acid, of an alkanecarboxylic acid of 3 to 4 carbon atoms or of a mixture of such acids, is heated with from 1 to 1.05 moles of bromine per mole of 2-aminoanthraquinone at from 130 to 150° C. and, after the mixture has cooled, the reaction product is isolated. No frothing occurs during the process.

The above process gives a 2-amino-3-bromoanthraquinone which contains 87 per cent by weight or more of the 2-amino-3-bromo compound. The product is purer than that obtained by the processes of the prior art from purified 2-amino-anthraquinone. The product may be used for the manufacture of all dyes based on 2-amino-3-chloroanthraquinone or 2-amino-3-bromoanthraquinone.

In general, the process is carried out by introducing the crude 2-aminoanthraquinone (which is as a rule about 85 per cent by weight pure) into the mixture of sulfuric acid, of from 60 to 90 per cent strength by weight, and alkanecarboxylic acids of 3 and/or 4 carbon atoms. The calculated amount of bromine or up to 1.05 times this amount, but preferably the calculated amount (ie. 1 mole of bromine per mole of 2-aminoanthraquinone) is then added at room temperature and the mixture is heated, whilst stirring, to 130–150° C., preferably 140–145° C., in the course of from 3 to 4 hours, and is kept at this temperature for from 1.5 to 4 hours. It is then allowed to cool. The suspension containing sulfuric acid is then filtered and the filter residue is washed with sulfuric acid of the same concentration. Thereafter, the filter cake is suspended in water, the suspension is filtered and the filter residue is washed neutral with water, and dried.

The amount of sulfuric acid of from 60 to 90 per cent strength by weight is as a rule from 7 to 15 times, advantageously from 8 to 12 times, the amount by weight of 2-aminoanthraquinone. Preferably, sulfuric acid of from 70 to 80 per cent strength by weight, especially of 75 per cent strength by weight, is used together with the carboxylic acids of 3 and/or 4 carbon atoms.

The amount of the said carboxylic acids is from 10 to 15 per cent by weight, based on the sulfuric acid. This generally corresponds to from 60 to 100 per cent by weight, based on crude 2-aminoanthraquinone.

Examples of carboxylic acids of 3 to 4 carbon atoms are propionic acid, butyric acid, isobutyric acid and mixtures of these. The use of propionic acid is preferred. The starting material for the process according to the present invention is crude 2-aminoanthroquinone as obtained by reacting 2-chloroanthraquinone with aqueous ammonia under pressure. The crude product on average contains 85 per cent of the 2-amino compound; purification is not necessary for carrying out the process of the present invention.

The product obtained in accordance with the process of the invention as a rule contains 87% of 2-amino-3-bromoanthraquinone, corresponding to a yield of 89% of theory, based on 2-amino-anthraquinone. The quality of the product is superior to that of the product obtainable from purified 2-aminoanthraquinone by the processes of the prior art.

Furthermore, the process according to the invention gives a somewhat higher yield of 2-amino-3-bromoanthraquinone, based on 2-aminoanthraquinone employed, than do the processes of the prior art.

If, in the process according to the invention, the carboxylic acids of 3 or 4 carbon atoms are replaced by acetic acid, a very impure 2-amino-3-bromoanthraquinone is obtained, which is unsuitable for use as a dye intermediate. Equally, the product obtained using alkanecarboxylic acid of 6 to 8 carbon atoms, eg. 2-ethylhexanoic acid, cannot be used as a dye intermediate.

In the Examples which follow, parts and percentages are by weight.

EXAMPLE 1

294 parts of crude 2-aminoanthraquinone (85% pure) are stirred with a mixture of 2,700 parts of 75% strength sulfuric acid and 300 parts of propionic acid and 170 parts of bromine are added at room temperature. The mixture is heated to 140° C. in the course of 3 hours and kept at this temperature for 2 hours. When it has cooled to room temperature, the mixture is filtered on an acid-resistant suction filter, and the filter residue is washed with 2,000 parts of 75% strength sulfuric acid and suspended in 4,000 parts of water. The suspension is filtered and the product is washed neutral with water and dried at 100° C.

Yield: 345 parts of 2-amino-3-bromoanthraquinone which is 87% pure (as determined by column chromatography/photometry), ie. 89% of theory.

EXAMPLE 2

The procedure described in Example 1 is followed, but instead of propionic acid the same amount of butyric acid is used. Yield: 343 parts of 2-amino-3-bromoanthraquinone (88% pure).

The same result is obtained if the butyric acid is replaced by isobutyric acid or by a mixture of butyric acid and isobutyric acid.

We claim:

1. In a process for the manufacture of 2-amino-3-bromoanthraquinone by heating 2-aminoanthraquinone with bromine in the molar ratio 1:1 in sulfuric acid, whilst mixing, the improvement wherein crude 2-aminoanthraquinone in sulfuric acid of from 60 to 90 per cent strength by weight, which contains from 10 to 15 per cent by weight (based on sulfuric acid), of an alkanecarboxylic acid of 3 or 4 carbon atoms or of a mixture of such acids, is heated with from 1 to 1.05 moles of bromine per mole of 2-aminoanthraquinone at from 130 to 150° C., and, after cooling, the reaction product is isolated.

2. A process as claimed in claim 1, wherein sulfuric acid of from 70 to 80 per cent strength by weight is used.

3. A process as claimed in claim 1, wherein sulfuric acid of 75 per cent strength by weight is used.

4. A process as claimed in claim 1, wherein the amount by weight of sulfuric acid used is from 7 to 15 times the amount by weight of 2-aminoanthraquinone.

5. A process as claimed in claim 1, wherein the amount by weight of sulfuric acid used is from 8 to 12 times the amount by weight of 2-aminoanthraquinone.

6. A process as claimed in claim 1, wherein propionic acid, butyric acid, isobutyric acid or a mixture of these is used as the carboxylic acid of 3 to 4 carbon atoms.

7. A process as claimed in claim 1, wherein the mixture is heated at from 140 to 145° C.

8. A process as claimed in claim 1, wherein propionic acid is used.

9. In a process for the manufacture of 2-amino-3-bromoanthraquinone by heating 2-aminoanthraquinone with bromine in the molar ratio 1:1 in sulfuric acid, whilst mixing, the improvement wherein crude 2-aminoanthraquinone in from 7 to 15 times its amount by weight of 75 per cent strength by weight sulfuric acid, which contains from 10 to 15% by weight (based on sulfuric acid) of propionic acid, is heated with from 1 to 1.05 moles of bromine per mole of 2-aminoanthraquinone at from 140 to 145° C., and, after cooling, the reaction product is isolated.

10. A process as claimed in claim 1, wherein said crude 2-aminoanthraquinone is from 85 to 87% by weight pure.